3,433,596
PROCESS FOR OBTAINING PURE SELENIUM
Rolf Wagenmann, Helbra, and Günther Wehle, Eisleben, Germany, assignors to VEB Mansfeld Kombinat "W. Pieck," Eisleben, Germany
No Drawing. Filed Sept. 20, 1965, Ser. No. 488,735
U.S. Cl. 23—209
Int. Cl. C01b 19/00
2 Claims

ABSTRACT OF THE DISCLOSURE

A process for obtaining selenium by precipitation from selenite solutions, comprising the steps of acidifying a selenium-containing aqueous solution, precipitating from the acidified solution magnesium selenite by the addition of a magnesium- and an ammonium salt with subsequent addition of ammonia until a pH of 7.5 to 8.5 is reached, filtering the precipitate and dissolving it once more in an acid solution, and finally recovering pure selenium from said solution by introducing $SO_2$ into the same.

---

This invention relates to a process for the preparation of or obtaining pure selenium by precipitation from selenite solutions, with satisfactory quality for use in the manufacture of rectifiers, photosensitive elements, and the like.

Selenium is obtained, in accordance with prior art, from a selenium-rich material obtained as a by-product in the electrolysis of copper. Sodium carbonate is admixed with this selenium-containing material as a flux, and the mixture is then used to obtain a slag. This is subsequently crushed, ground, is then leached out with water and acidified with sulfuric acid to pH 6–7 at which point the tellurium content precipitates.

The solution is then filtered and further acidified with sulfuric acid. Sulfur dioxide is introduced into the acidified solution until practically the entire amount of selenite precipitates as elementary selenium which is then recovered by filtration. The filtrate is heated to 85–90° C., thiourea is added, and sulfur dioxide is introduced until the entire selenate is reduced to elementary selenium.

Another method is also known in the prior art, according to which the selenium-containing anode mud obtained in copper electrolysis is first dried and then roasted under oxidizing conditions. An alkaline leaching follows under strong agitation with air. The solids are separated by decantation and the selenium-containing solution is brought to pH 6–7 by the addition of sulfuric acid. A part of the alkali-soluble impurities, such as lead and silica, precipitate in the form of a viscous precipitate. This is separated from the solution, then hydrochloric acid is added to the clear, selenium-containing solution, whereby selenous as well as selenic acid are formed. The solution is then heated to about 80° C. and iron II sulfate is added to reduce the selenic acid. Subsequently selenium is precipitated by the addition of sulfur dioxide.

A drawback of these prior-art methods is that the selenium-containing solution available as technical by-products are more or less strongly contaminated with impurities. When selenium is directly precipitated with sulfur dioxide, a great part of these impurities precipitates along. It is also another disadvantage that these impurities can be removed only to an unsatisfactory degree by means of a subsequent acidic or alkaline wash of the fine-ground selenium. Even if the wash is followed by distillation, the spectral analysis of the selenium thus obtained still shows considerable amounts of impurities. Further distillation of the selenium is unpractical.

It is further known that selenium may be precipitated from selenate solutions derived from hexavalent selenium by barium as a difficultly soluble barium selenate. However, this process is unsuccessful with selenite solutions since barium selenite is comparatively readily soluble and therefore a satisfactory separation of selenium from the original solution is not possible.

It is an object of the invention to eliminate the drawbacks of the prior art and to provide a process for obtaining selenium of increased purity.

In accordance with an important feature of the invention it has been found that selenium can be obtained in great purity if magneisum selenite is precipitated from the starting solution. The magnesium selenite can be re-dissolved to obtain pure selenium.

In accordance with the preferred process of the present invention, magnesium selenite ($MgSeO_3 \cdot 6H_2O$), a crystalline, easily filterable, acid-soluble product of high purity is precipitated from the initial, impure, selenium-containing solution. This is accomplished by acidifying the selenite-containing solution to pH 2–3 and then adding a solution containing a magnesium salt and an ammonium salt. The precipitation of the magnesium-selenite crystals is accomplished by introducing gaseous ammonia or by adding ammonium hydroxide under constant stirring at 60–70° C. until pH 8. Precipitation can be obtained from nitrate-, sulfate-, or chloride-containing mother liquors. The magnesium selenide is re-dissolved in accordance with the invention in dilute hydrochloric or sulfuric acid, and elementary selenium can be obtained in great purity by introducing sulfur dioxide into the solution.

The process of the present invention can be carried out with simple and inexpensive equipment and the selenium thus obtained is of unusually high purity.

In the following examples, the best method contemplated for carrying out the invention is given, but the invention is not limited to all details of the examples.

EXAMPLE I 700 liters of an industrial solution, a by-product obtained from the anode mud when performing copper electrolysis, was filtered to remove its solid impurities. The solution contained 25 grams selenium per liter. The solution was acidified to pH 2. 240 liters of a solution containing 4 kp (kiloponds) of $MgSO_4 \cdot 7H_2O$, and 1 kp $NH_4Cl$ for each 10 liters of water, was added to the solution which was then heated, while stirring, to 60–70° C. Subsequently gaseous ammonia was introduced until a pH value of 8 was reached. The material precipitated under stirring during a period of 3 hours.

The crystalline precipitate was filtered off and analyzed, and was found to contain 25% by weight selenium. The selenium content of the filtrate was less than 0.2 grams per liter. The precipitate was dissolved in 150 liters of a 6 N hydrochloric acid and pure selenium was obtained by introduction of $SO_2$ into this solution. After washing, the purity of the selenium was found to be 99.96% by weight.

EXAMPLE II 100 grams selenium was dissolved in 350 milliliters concentrated nitric acid and the solution was brought to 0.5 liter by diluting it with water. 1.4 liters of a precipitating solution containing 400 grams $MgSO_4 \cdot 7H_2O$ and 100 grams $NH_4Cl$ per each liter of water was added to the selenium solution. The solution was then heated to 60° C. and ammonium hydroxide was added, while stirring, until a pH 8 was reached. Stirring was continued during precipitation, for a period of 3 hours, and the white crystalline precipitate of $MgSeO_3 \cdot 6H_2O$ was filtered off.

The filtrate contained only 0.26 grams selenium per liter. 362 grams $MgSeO_3$ was obtained with a selenium content of 27.5% by weight. The precipitate was dissolved in 900 milliliters 6 N hydrochloric acid and selenium of high purity was precipitated by introducing sulfur dioxide into the solution.

The foregoing disclosure relates only to a preferred, exemplary manner of carrying out the invention, which is intended to include all changes and modifications of the process described within the scope of the invention as set forth in the appended claims.

What we claim is:

1. A process for obtaining selenium, comprising the steps of acidifying a selenium-containing aqueous solution to a pH of about 2 to 3, precipitating from the acidified solution magnesium selenite by the addition of a magnesium- and an ammonium salt with subsequent addition of ammonia until a pH of 7.5 to 8.5 is reached, filtering the precipitate and dissolving it once more in an acid solution, and finally recovering pure selenium from said solution by introducing $SO_2$ into the same.

2. A process for obtaining selenium, comprising the steps of precipitating magnesium selenite from a solution containing selenium and nitrate ions and having a pH in the range of 2 to 3, by adding a magnesium- and an ammonium salt with subsequent addition of ammonia until a pH of about 8 is reached, separating the precipitated selenite, dissolving the separated selenite once more in an acid solution, and finally precipitating pure selenium from the last solution by introducing $SO_2$.

References Cited

UNITED STATES PATENTS

| | | | |
|---|---|---|---|
| 2,349,697 | 5/1944 | Bierly | 23—209 |
| 2,409,835 | 10/1946 | Clark et al. | 23—209 |
| 2,834,652 | 5/1958 | Hollander et al. | 23—209 |
| 2,835,558 | 5/1958 | Vaaler | 23—209 |

OSCAR R. VERTIZ, *Primary Examiner.*

L. A. MARSH, *Assistant Examiner.*